United States Patent [19]

Badberg et al.

[11] 4,134,784
[45] Jan. 16, 1979

[54] MANDREL ASSEMBLY FOR FORMING AN INTERNALLY VENTED FILLER NECK HOSE

[75] Inventors: Melvin C. Badberg, Lincoln, Nebr.; Thomas G. Hutchins, Wadsworth, Ohio; Roy W. Olsen; James W. Zachmeyer, both of Lincoln, Nebr.

[73] Assignee: The Goodyear Tire & Rubber Company, Akron, Ohio

[21] Appl. No.: 793,583

[22] Filed: May 4, 1977

Related U.S. Application Data

[62] Division of Ser. No. 643,974, Dec. 24, 1975, abandoned.

[51] Int. Cl.² ............................ B29C 1/16; B32B 31/02
[52] U.S. Cl. ..................................... 156/423; 249/144; 425/393; 425/468
[58] Field of Search ............... 156/294, 423, 500; 264/248, 250, 255; 128/349 B; 280/5 R; 249/63, 144, 146–149, 151, 154; 220/86 R; 425/392, 393, 468, 501

[56] References Cited
U.S. PATENT DOCUMENTS

| | | | |
|---|---|---|---|
| 2,230,150 | 1/1941 | Winder | 128/349 B |
| 2,320,157 | 5/1943 | Raiche | 128/349 B |
| 2,481,488 | 9/1949 | Auzin | 128/349 B |

*Primary Examiner*—Caleb Weston
*Attorney, Agent, or Firm*—L. A. Germain

[57] ABSTRACT

A filler neck for mounting between a fueling port and a fuel tank provides fuel entry into the tank and venting of fuel vapor from the tank while being serviced from a fuel dispensing nozzle having vapor recovery means. The filler neck comprises a reinforced rubber filler hose having a bore diameter sufficient for receiving the nozzle while also providing a vent path for fuel vapor from the tank through a vent hose mounted inside the filler hose bore. The internally vented filler neck is adapted for crash-proof fuel tank assemblies and eliminates multiple connections necessary on externally vented tanks. A mandrel assembly is also disclosed for making the internally vented filler neck.

4 Claims, 4 Drawing Figures

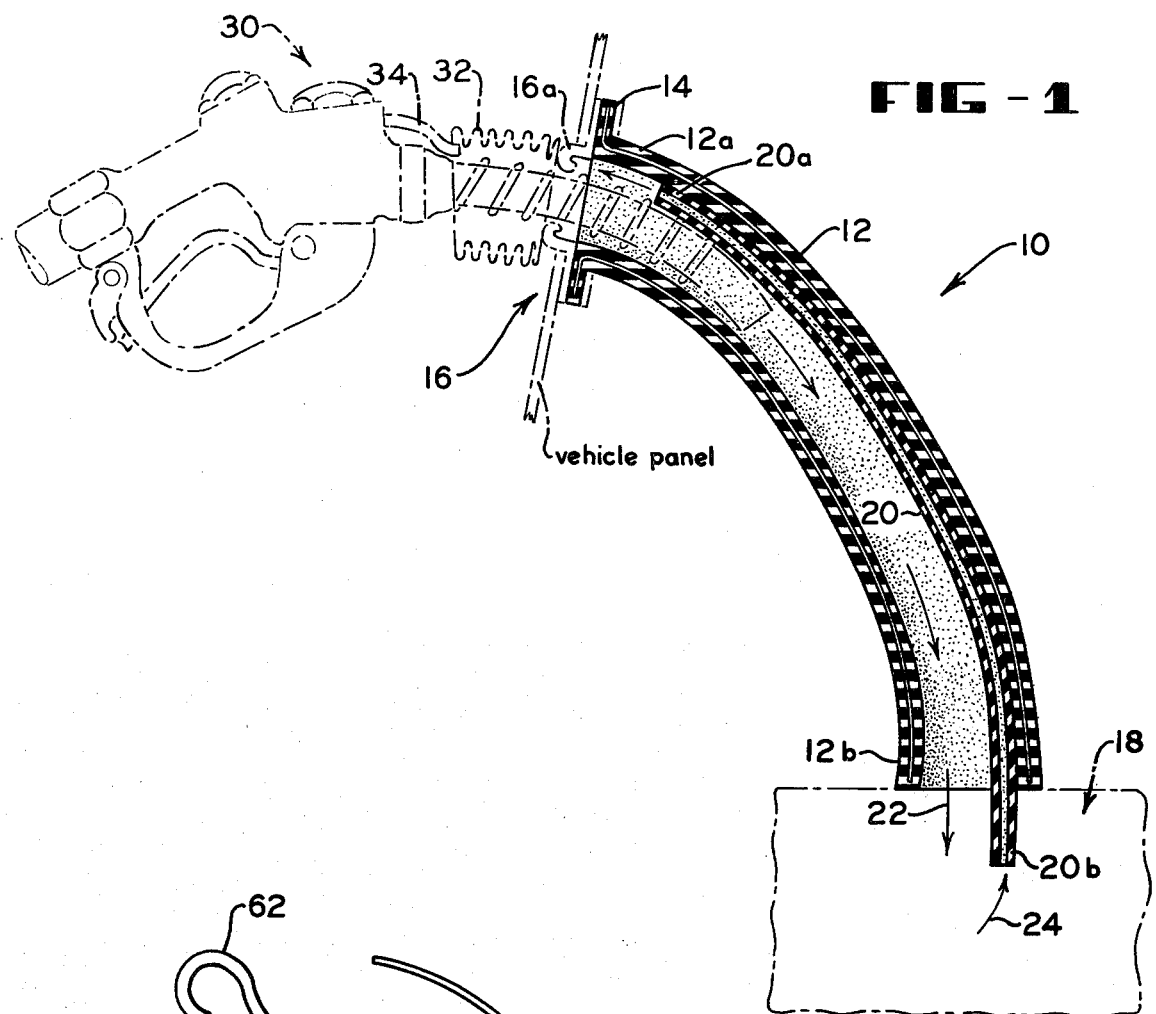
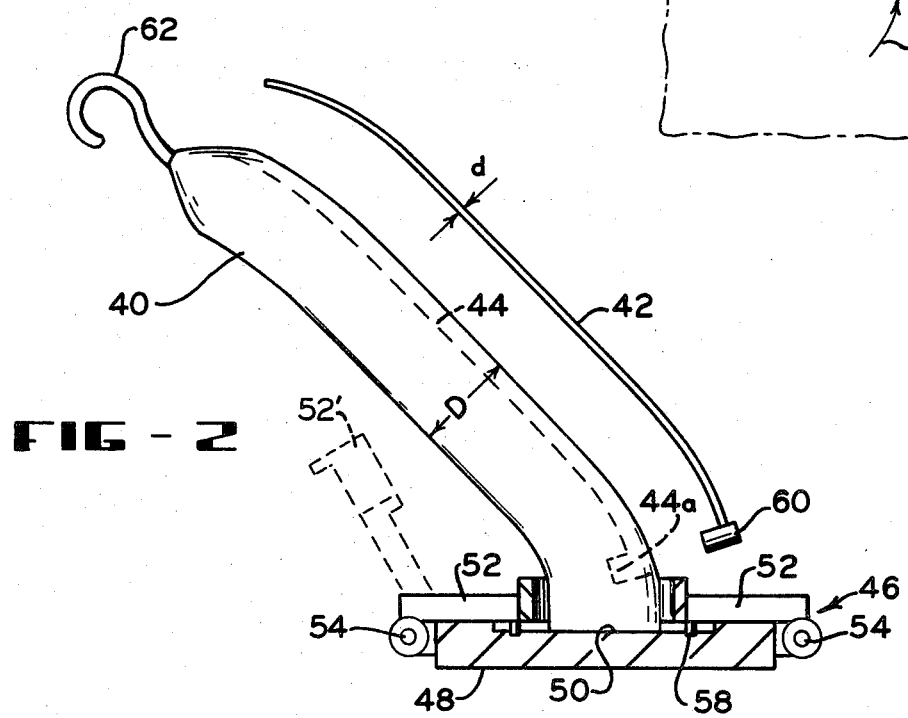

MANDREL ASSEMBLY FOR FORMING AN INTERNALLY VENTED FILLER NECK HOSE

This is a Division of application Ser. No. 643,974 filed Dec. 24, 1975, abandoned.

BACKGROUND OF THE INVENTION

This invention generally relates to fuel vapor recovery systems and more particularly to a filler neck hose that provides a vent path for fuel vapor from the tank being filled to a vapor recovery, fuel dispensing nozzle.

In the activity of refueling tanks, fuel loss in the form of vapor is considered to be measured in the thousands of tons per year and this waste, as well as the obvious hazard and polluting effect, is being countered by various vapor recovery schemes. These schemes generally include duel hoses connected between the fuel pump supply and the dispensing nozzle, one hose carrying fuel to the nozzle while the other provides a return path for fuel vapor. While manufacturers of fuel delivery systems are concentrating efforts in the development of vapor recovery pumps and nozzles, tank manufacturers are concentrating efforts in the development of crash-proof fuel tanks. In this circumstance, the instant invention bridges a gap that exists between the above mentioned efforts by providing a filler neck that is adapted to crash-proof tank assemblies while also providing a means to vent fuel vapor from the tank in the process of being filled. The invention eliminates multiple connections necessary on externally vented fuel tanks of the prior art.

The advantages of the invention will become evident from the description that follows when considered in conjunction with the accompanying drawings in which like parts bear like reference numerals.

IN THE DRAWINGS

FIG. 1 is an elevational view, in section, of the filler neck hose embodying the invention, illustrating its relationship in a typical vehicle mounting and a dispersing arrangement shown in phantom lines;

FIG. 2 is an elevational view, in partial section, illustrating a mandrel assembly for forming an integrally vulcanized internal vent filler neck hose;

Figure 3:
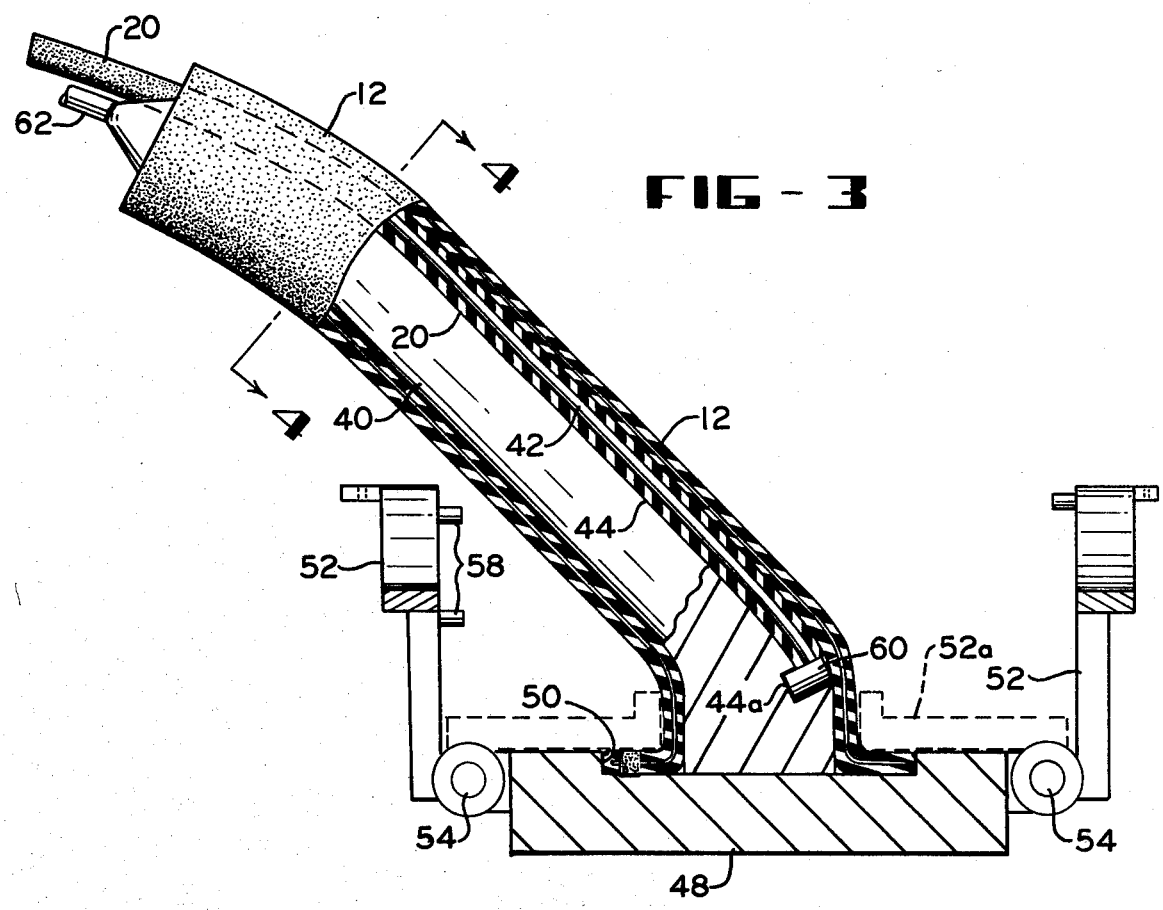
FIG. 3 is an elevational view, in partial section, showing the hose/mandrel relationship.

Referring to FIG. 1, a filler neck assembly is generally indicated by reference number 10. The assembly comprises a filler neck hose 12 having an integrally vulcanized flange 14 at its upper end 12a that is adapted for vehicle mounting generally indicated at numeral 16. The upper end mounting 12a may be a crash-proof breakaway assembly of the type described in U.S. Pat. No. 3,856,316 issued Dec. 24, 1974, and assigned to The Goodyear Tire & Rubber Company, Akron, Ohio, or it may be any other mounting configuration compatible with the rubber filler hose of the present invention. At its lower end 12b, the filler hose 12 is attached into a fuel tank 18 and it is contemplated that the attachment may be by any means designated by the tank manufacturer such that the safety integrity of the fuel system is maintained in a crash situation. Usual attachments include tank boss-clamp and formed end-tank grommet arrangements.

Mounted inside the filler hose 12 is a second, smaller diameter vent hose 20 that extends from a point 20a just inside of the upper flanged end 12a to a short length 20b beyond the lower end 12b of the filler hose. The extension 20b at the bottom end is long enough to enter the upper portion of the tank 18 to provide a vent path through the hose 20. For example, fuel delivered into the filler neck 12 by a dispensing nozzle (shown in ghost lines and generally indicated by reference number 30) moves down the filler neck in the direction of arrows 22 and enters the tank 18 while trapped air and/or fuel vapor are vented through the hose 20 in the direction of arrows 24, to be returned to the fuel source via vapor recovery apparatus installed in the dispersing nozzle. Of course, the nozzle 30 includes means 32 for sealing the entry port 16a into the filler neck assembly and means 34 for drawing the fuel vapor thus vented back into the supply tank. A fuel dispensing nozzle of the type alluded to is described in U.S. Pat. No. 3,840,055 issued Oct. 8, 1974, and assigned to The Atlantic Richfield Company, New York, N.Y.

The filler neck hose 12 comprises an extruded acrylonitrile-butadiene copolymer rubber (hereinafter referred to as NBR) having a braided or knitted textile reinforcement thereon and covered with an extrusion of polychloroprene rubber, while the vent hose 20 is a smaller diameter NBR extrusion, both hoses being cut to the desired length depending upon the type of tank installation. Of course, other compounded elastomers may be used that are resistant to the deleterious effects of hydrocarbon fuels and the invention is not considered limited by the type compound used.

Forming of the internally vented filler neck hose is accomplished with a mandrel assembly illustrated in FIG. 2. The assembly comprises a filler hose mandrel 40 having a diameter "D" of approximately the bore diameter of the hose 12, and a vent hose mandrel 42 having a diameter "d" of approximately the bore diameter of the vent hose 20. The mandrel 40 is characterized by a flange-forming fixture 46 at one end thereof that is stationarily affixed to the mandrel. The fixture 46 includes a base 48 having a recessed portion 50 and a pair of semi-circular plates 52 that are hinged at 54 to accommodate removal of the flanged hose from the mandrel. Reference No. 52' illustrates the open position of the plates 52 to facilitate positioning of an uncured hose 12 on the mandrel 40. Since the purpose of the hose flange may be for vehicle panel mounting, hinged plates 52 have a number of evenly spaced studs 58 on the bottom surface thereof to provide mounting holes in the flange upon being vulcanized. In the surface of the mandrel 40 there is a semi-circular groove 44 running the substantial length thereof, which groove terminates in a recess 44a near the flange forming fixture end of the mandrel. The purpose of the groove 44 and recess 44a will be more fully understood hereinafter. In the use of the mandrel assembly, a hook 62 is provided for hanging to an overhead conveyor that carries a plurality of such assemblies to a curing chamber, or alternately, the base 48 may be adapted for attachment to a table conveyor that moves through a curing chamber.

The vent hose mandrel 42 conforms to the length and curvature of the groove 44 and includes an end-stop 60 that provides locking engagement of the mandrel 42 on the filler hose mandrel 40 by reason of its being seated in the recess 44a. The stop 60 facilitates removal of the filler/vent hose combination from the mandrel assembly 40,42 since the hoses are vulcanized into a single integral unit.

Figure 4:
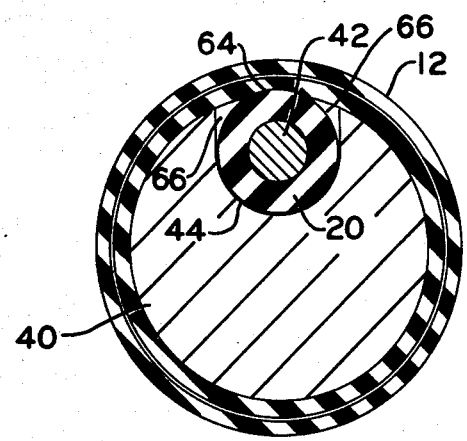
FIG. 4 is an enlarged sectional view taken on line 4—4 of FIG. 3.

FIGS. 3 and 4 more clearly illustrate the relationship between the mandrels 40, 42 and the hoses 12, 20 respectively. Referring to the drawing, an unvulcanized, extruded length of vent hose 20 is slipped onto mandrel 42 until its end abuts the stop 60. The vent hose/mandrel assembly is mounted on the filler hose mandrel 40 so that the stop 60 is received in the recess 44a while the vent hose 20 is craddled in the groove 44. With the flange forming plates 52 in the open position shown, an unvulcanized filler neck hose 12 is drawn up on the mandrel 40 and over the vent hose/mandrel assembly until the end 12a spreads into the flange forming recess 50. As shown in FIG. 4, the unvulcanized filler and vent hoses are in abutting relationship at 64 such that, upon being vulcanized, the elastomer flows into the area 66 and an integral bond is effected between the two hoses. In rotating the plates 52 to their closed position 52a, the studs 58 penetrate the elastomer and cause mounting holes to be formed in the flange material. Upon being vulcanized, plates 52 are rotated to the open position 52' and the integrally vulcanized hoses are pulled off the mandrel assembly with the vent mandrel 42 remaining in position by reason of the locked-in end-stop 60.

In an alternate method, the filler neck hose 12 is formed and vulcanized on the mandrel 40 absent a vent hose/mandrel assembly 20,42. The mandrel 40 will not have a groove 44 or recess 44a but may include a semi-circular boss in place thereof that results in the formation of a groove conforming to the inside of the filler hose bore upon being vulcanized. In this instance, the vent hose 20 is a separately vulcanized length that is post-assembled in the filler hose bore and adhesively secured in the groove. An adhesive that results in a bond sufficient for the application is marketed by the Loctite Corporation under the name Super Bonder 04-E.

While certain representative embodiments and details have been shown for the purpose of illustrating the invention, it will be apparent to those skilled in this art that various changes and modifications may be made therein without departing from the spirit or scope of the invention.

What is claimed is:

1. A mandrel assembly for forming and vulcanizing an internal vent filler neck as would be mounted between a fueling port and a fuel tank, the filler neck characterized by a vent hose integrally vulcanized within the bore of a larger diameter filler neck hose, said mandrel assembly comprising:
   A. a vent hose mandrel of a length and diameter for mounting an unvulcanized length of vent hose thereon and having means at one end for limiting the axial movement of the hose on the mandrel; and
   B. a filler neck mandrel of a length and diameter for mounting an unvulcanized length of filler hose thereon, said filler neck mandrel having a longitudinal groove running the substantial length thereof that terminates in a recess at one end, said groove and recess adapted for cradling the vent hose and receiving the vent hose limiting means respectively such that the outside longitudinal length of the vent hose is in intimate contact with the inside surface of the filler hose bore.

2. The mandrel assembly as set forth in claim 1 wherein the filler neck mandrel includes a flange forming fixture on the end proximate to the vent hose limiting means.

3. The mandrel assembly as set forth in claim 2 wherein the flange forming fixture comprises:
   (a) a base plate stationarily attached to the filler neck mandrel and having an annular recess therein for receiving an end portion of the unvulcanized filler hose; and
   (b) a pair of plates having semi-circular portions for inclosing the filler neck mandrel, said plates being hinged to the base plate for rotation from a horizontal closed position to a vertical open position, said plates inclosing the end portion of the filler hose in the annular recess when in the horizontal closed position to effect forming of a hose flange upon vulcanization.

4. The mandrel assembly as set forth in claim 3 wherein the pair of plates inclosing the hose end in the base plate recess have a plurality of inwardly facing studs to effect forming of mounting holes in the flanged end of the hose.

* * * * *